United States Patent
Stayton et al.

(10) Patent No.: US 11,518,402 B2
(45) Date of Patent: Dec. 6, 2022

(54) SYSTEM AND METHOD FOR CONTROLLING A VEHICLE USING CONTEXTUAL NAVIGATION ASSISTANCE

(71) Applicants: Nissan North America, Inc., Franklin, TN (US); Renault S.A.S., Boulogne-Billancourt (FR)

(72) Inventors: Erik Stayton, Ashland, MA (US); Laura Cesafsky, San Francisco, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 509 days.

(21) Appl. No.: 16/804,809

(22) Filed: Feb. 28, 2020

(65) Prior Publication Data

US 2021/0269054 A1  Sep. 2, 2021

(51) Int. Cl.
| | |
|---|---|
| *B60W 50/16* | (2020.01) |
| *B60W 40/09* | (2012.01) |
| *G01C 21/36* | (2006.01) |
| *G07C 5/08* | (2006.01) |

(Continued)

(52) U.S. Cl.
CPC ............ *B60W 50/16* (2013.01); *B60W 40/09* (2013.01); *G01C 21/3605* (2013.01); *G06N 3/0445* (2013.01); *G06N 3/0454* (2013.01); *G06V 20/597* (2022.01); *G07C 5/0816* (2013.01)

(58) Field of Classification Search
CPC ... B60W 40/09; B60W 50/16; G01C 21/3605; G01C 21/3629; G01C 21/3655; G06K 9/6271; G06N 3/0445; G06N 3/0454; G06N 5/003; G06V 10/82; G06V 20/597
See application file for complete search history.

(56) References Cited

U.S. PATENT DOCUMENTS

| | | | |
|---|---|---|---|
| 9,963,106 B1 * | 5/2018 | Ricci | G08G 1/096725 |
| 10,222,228 B1 * | 3/2019 | Chan | B60W 40/09 |
| 10,386,195 B1 * | 8/2019 | Grunberger | G01C 21/34 |

(Continued)

FOREIGN PATENT DOCUMENTS

| | | |
|---|---|---|
| JP | 2017-096963 A | 6/2017 |
| WO | 2018/104563 A2 | 6/2018 |
| WO | 2018/202757 A1 | 11/2018 |

*Primary Examiner* — Babar Sarwar
(74) *Attorney, Agent, or Firm* — Young Basile Hanlon & MacFarlane, P.C.

(57) ABSTRACT

Controlling a vehicle using contextual navigation assistance can include defining a context for the vehicle using sensor data for a plurality of time points while the vehicle traverses between a starting and stopping location, the context being one of multiple contexts, and each associated with at least one candidate variable for inclusion in an ordered representation of information, classifying the vehicle into a phase of multiple phases associated with different proximities of the vehicle to a maneuver, each phase associated with at least one candidate variable for inclusion in the ordered representation, and generating, using the phase and the context, the ordered representation. The ordered representation is ranked from most likely to least likely information that is necessary, during a current phase, to successfully complete the maneuver. The ordered representation is produced by a user interface so that it can be used to control the vehicle.

20 Claims, 8 Drawing Sheets

(51) Int. Cl.
*G06N 3/04* (2006.01)
*G06V 20/59* (2022.01)

(56) References Cited

U.S. PATENT DOCUMENTS

| | | | |
|---|---|---|---|
| 2010/0324816 A1* | 12/2010 | Highstrom | G01C 21/367 |
| | | | 701/533 |
| 2014/0005924 A1* | 1/2014 | Letz | G01C 21/343 |
| | | | 701/424 |
| 2015/0112593 A1* | 4/2015 | Kandangath | G01C 21/3644 |
| | | | 701/400 |
| 2016/0090086 A1* | 3/2016 | Takamatsu | B60W 50/16 |
| | | | 701/1 |
| 2018/0003518 A1* | 1/2018 | Hoareau | G01C 21/3484 |
| 2018/0144369 A1* | 5/2018 | Pouliot | G08G 1/161 |
| 2018/0348003 A1* | 12/2018 | Coleman | G06F 16/29 |
| 2019/0219417 A1* | 7/2019 | Quint | G01C 21/3632 |
| 2019/0277643 A1* | 9/2019 | Szubbocsev | G05D 1/0088 |
| 2019/0293437 A1* | 9/2019 | Szubbocsev | G06F 16/29 |
| 2020/0074320 A1* | 3/2020 | Seshadri | G06N 20/20 |
| 2020/0217678 A1* | 7/2020 | Jones | B60W 60/0015 |
| 2020/0234582 A1* | 7/2020 | Mintz | G08G 1/0145 |
| 2020/0298847 A1* | 9/2020 | Tawari | B60W 30/0956 |
| 2020/0339157 A1* | 10/2020 | Yurdana | B60W 50/14 |
| 2021/0339759 A1* | 11/2021 | Fouad | G06V 10/764 |

\* cited by examiner

SYSTEM AND METHOD FOR CONTROLLING A VEHICLE USING CONTEXTUAL NAVIGATION ASSISTANCE

TECHNICAL FIELD

This disclosure relates generally to vehicle operational management and driving, and more particularly to using contextual navigation assistance for controlling a vehicle.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing navigation using the captured data.

SUMMARY

Disclosed herein are aspects, features, elements, implementations, and embodiments for controlling a vehicle using contextual navigation assistance that varies the level of navigation assistance provided to make a maneuver based on the context of the vehicle while leading up to and optionally completing the maneuver.

An aspect of the disclosed embodiments is an apparatus or system for controlling a vehicle traversing a vehicle transportation network using contextual navigation assistance. The system can include a processor configured to receive, while the vehicle traverses a route from a starting location to a stopping location within the vehicle transportation network, sensor data indicating at least a condition of the vehicle. A context model is configured to define a context for the vehicle using the sensor data for a plurality of time points while the vehicle traverses from the starting location to the stopping location, wherein the context is one of multiple contexts, and each context is associated with at least one candidate variable for inclusion in an ordered representation of information. A phase classifier is configured to classify, using the sensor data, the vehicle into a phase of multiple phases associated with different proximities of the vehicle to a maneuver of the vehicle along the route for the plurality of time points, wherein each phase is associated with at least one candidate variable for inclusion in the ordered representation of information. An information-needs model is configured to generate, using the phase and the context as input, the ordered representation of information regarding the maneuver of the vehicle along the route for the plurality of time points, wherein the ordered representation of information is ranked from most likely information that is necessary, during a current phase of the multiple phases, to successfully complete the maneuver to least likely information that is necessary, during the current phase of the multiple phases, to successfully complete the maneuver. A user interface is configured to produce the ordered representation of information at a current time point for use during the current phase of the multiple phases of the maneuver. In some implementations, a trajectory controller is configured to control at least one component of the vehicle during the current phase of the multiple phases based on feedback from the vehicle related to at least one entry in the ordered representation of information.

Another apparatus or system for controlling a vehicle traversing a vehicle transportation network using contextual navigation assistance can include a processor configured to receive, while the vehicle traverses a route from a starting location to a stopping location within the vehicle transportation network, sensor data indicating at least a condition of the vehicle. For a plurality of time points while the vehicle traverses from the starting location to the stopping location, the processor is configured to generate, responsive to the sensor data, an ordered representation of information regarding a maneuver of the vehicle along the route, wherein the maneuver comprises multiple phases associated with different proximities of the vehicle to the maneuver, and the ordered representation of information is ranked from most likely information that is necessary, during a current phase of the multiple phases, to successfully complete the maneuver to least likely information that is necessary, during the current phase of the multiple phases, to successfully complete the maneuver, and is configured to produce, by a user interface, the ordered representation of information at a current time point for use in controlling the vehicle during the current phase of the multiple phases of the maneuver. A trajectory controller may be configured to control at least one component of the vehicle during a current phase of the multiple phases based on feedback from the vehicle related to at least one entry in the ordered representation of information.

Another aspect of the disclosed embodiments is a method for controlling a vehicle traversing a vehicle transportation network using contextual navigation assistance. The method includes receiving, while the vehicle traverses a route from a starting location to a stopping location within the vehicle transportation network, sensor data indicating at least a condition of the vehicle, generating, responsive to the sensor data, a first ordered representation of information regarding a maneuver of the vehicle along the route, wherein the maneuver comprises multiple phases associated with different proximities of the vehicle to the maneuver, and the first ordered representation of information is ranked from most likely information necessary, during a first phase of the multiple phases, to successfully complete the maneuver to least likely information that is necessary, during the first phase of the multiple phases, to successfully complete the maneuver; producing, by a user interface, the first ordered representation of information at a first point in time for use while during the first phase of the multiple phases of the maneuver, and controlling, using a trajectory controller, the vehicle during the first phase based on feedback from the vehicle related to at least one entry in the first ordered representation of information. The method also includes generating, responsive to the sensor data, a second ordered representation of information regarding the maneuver of the vehicle along the route, wherein the second ordered representation of information is ranked from most likely information that is necessary to know, during a second phase of the multiple phases, to successfully complete the maneuver to least likely information that is necessary to know, during the second phase of the multiple phases, to successfully complete the maneuver, and the second phase of the multiple phases is subsequent to the first phase, producing, by the user interface, the second ordered representation of information at a second point in time for use during the second phase of the multiple phases, wherein the second point in time is subsequent to the first point in time, and controlling, using a trajectory controller, the vehicle during the second phase based on feedback from the vehicle related to at least one entry in the second ordered representation of information. More than two phases are possible, so the steps can be repeated for additional phases of the multiple phases.

Variations in these and other aspects, features, elements, implementations, and embodiments of the methods, apparatus, procedures, systems, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
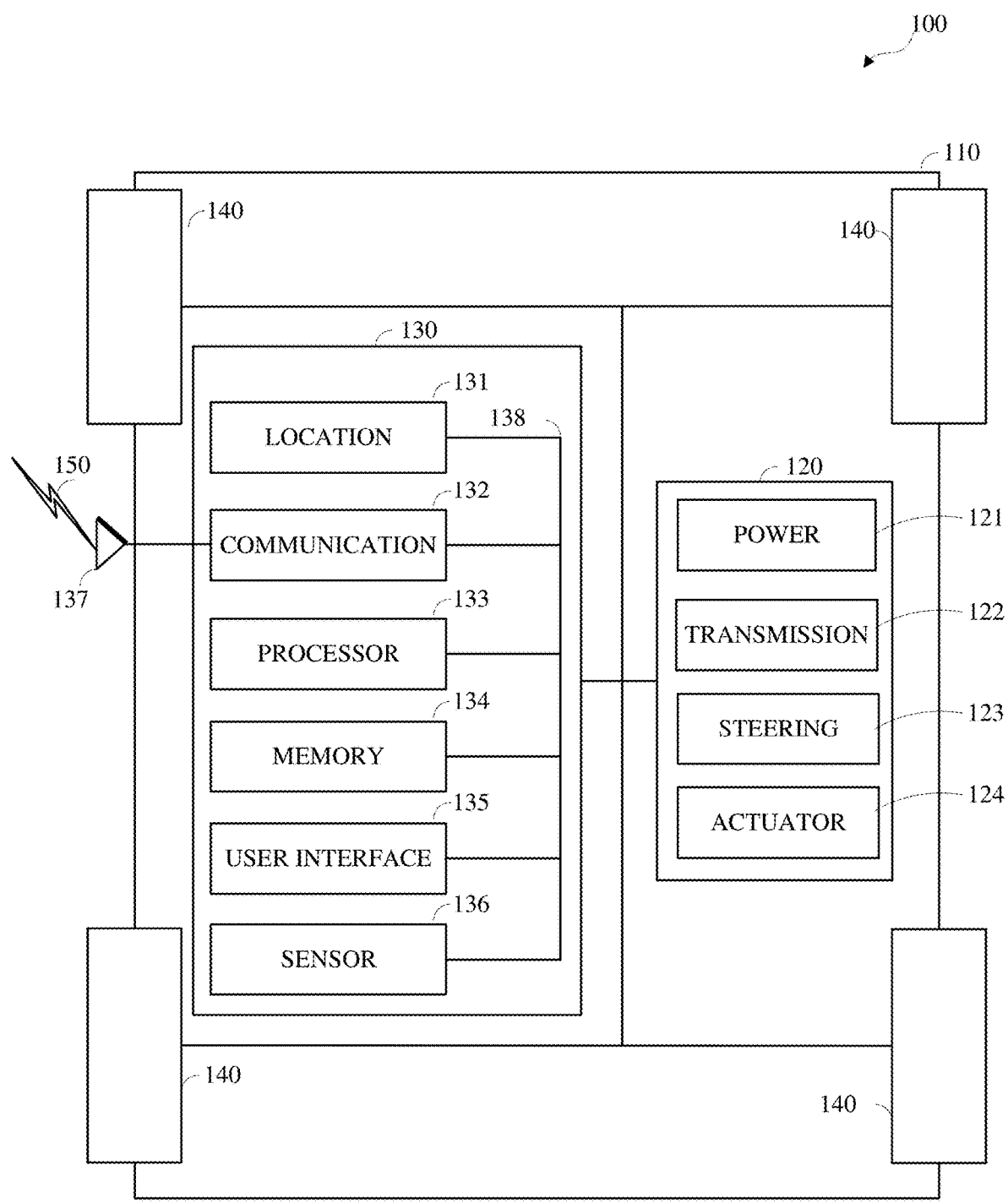
FIG. 1 is a diagram of an example of a vehicle in which the aspects, features, and elements disclosed herein may be implemented.

A vehicle may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

While the vehicle is traversing a route from a starting point to a stopping point (e.g., a waypoint or ending point), navigation assistance may be used by the vehicle. A navigation system that performs navigation assistance may use a variety of environmental cues to assist in navigation. For example, a simple instruction to turn left or right may be aided by the presence of cues such as street names, signage, traffic light and stop sign locations, stores, other points-of-interest, or some combination thereof. However, these systems do not identify whether additional information is needed in any particular case, and often tend to provide either too much or too little information as a result. In some cases, a navigation system may look to an intersection type or local geographical factors to determine what cue will be most generally useful. Some systems may further use information from sensors to provide interaction-specific advice such as "follow the blue car." Like the other systems, there is no feedback that measures whether or not the additional information is helpful in any particular instance.

Rather than treating every maneuver as equal, and hence providing the same level of navigation assistance for every maneuver, systems described herein are designed to anticipate likely difficulties and needs. A navigation system can provide additional information in cases of particular need, while refraining from providing an overload of information in cases where assistance is not required or not desirable. This context-aware system may use internal camera(s) and driver/operator state monitoring, as well as external roadway monitoring via cameras to identify when an operator may be having trouble, in which case the system provides additional assistance. The system also includes the possibility to use crowdsourced information (e.g., about difficult intersections) as a data source for making decisions regarding the assistance.

The vehicle assistance may be provided to an operator of the vehicle. The operator may be a driver within the vehicle, where the vehicle is an autonomous vehicle (AV), a semi-autonomous vehicle, or any conventional powered vehicle. An operator may alternatively or additionally be remote from the vehicle, such as at a remote vehicle support location, and use navigation assistance with the vehicle itself or with an operator within the vehicle. The navigation assistance may be used by a remote operator to tele-operate the vehicle. For example, feedback responsive to the navigation assistance may be used to control the vehicle (e.g. using a trajectory controller).

Details of the contextual navigation assistance are described in detail below starting with a description of an example vehicle with which the invention may be used.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickelcadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communicate with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle, e.g., a vehicle including one or more Advance Driver Assistance Systems (ADAS), or a conventional vehicle.

Figure 2:
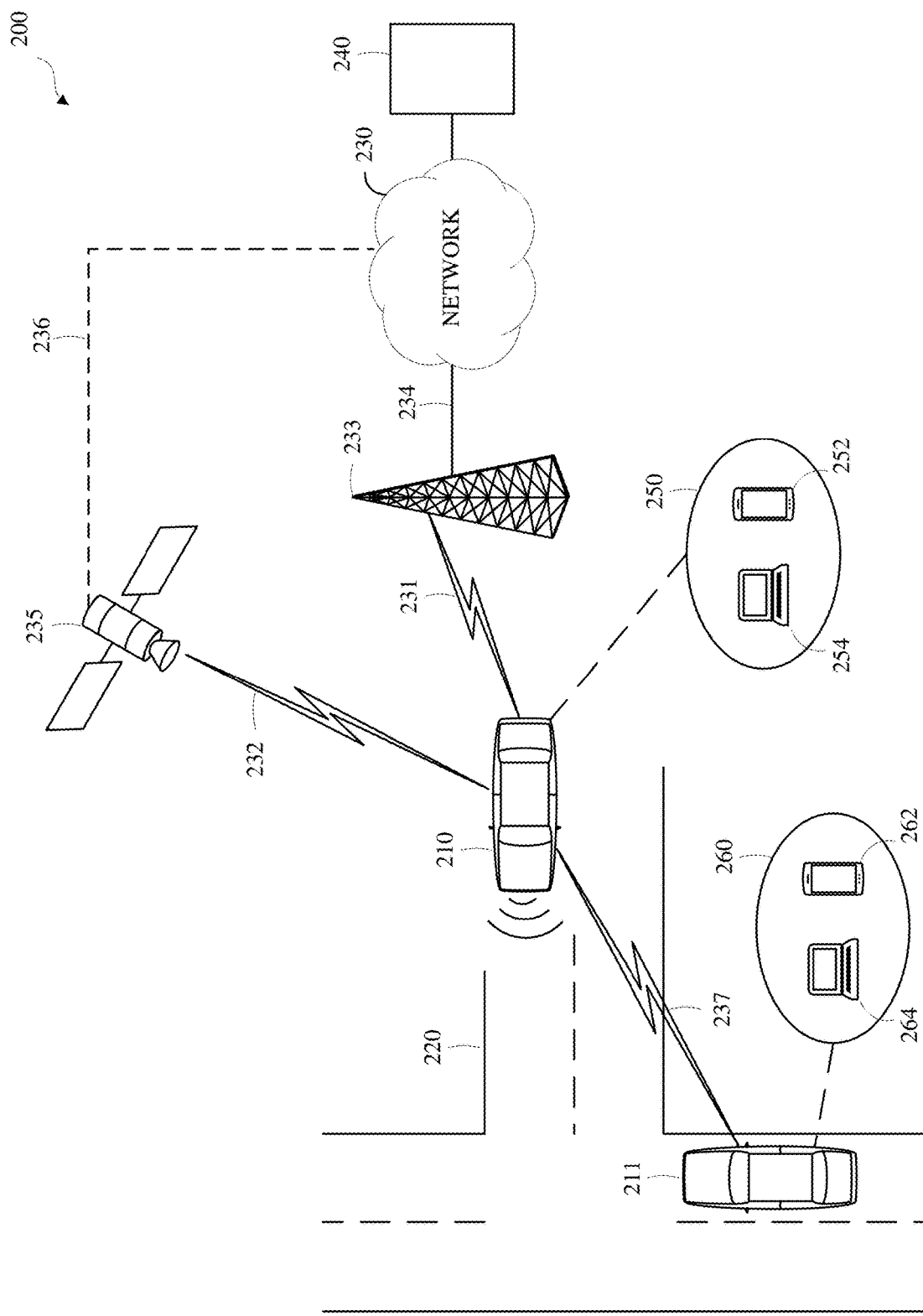
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
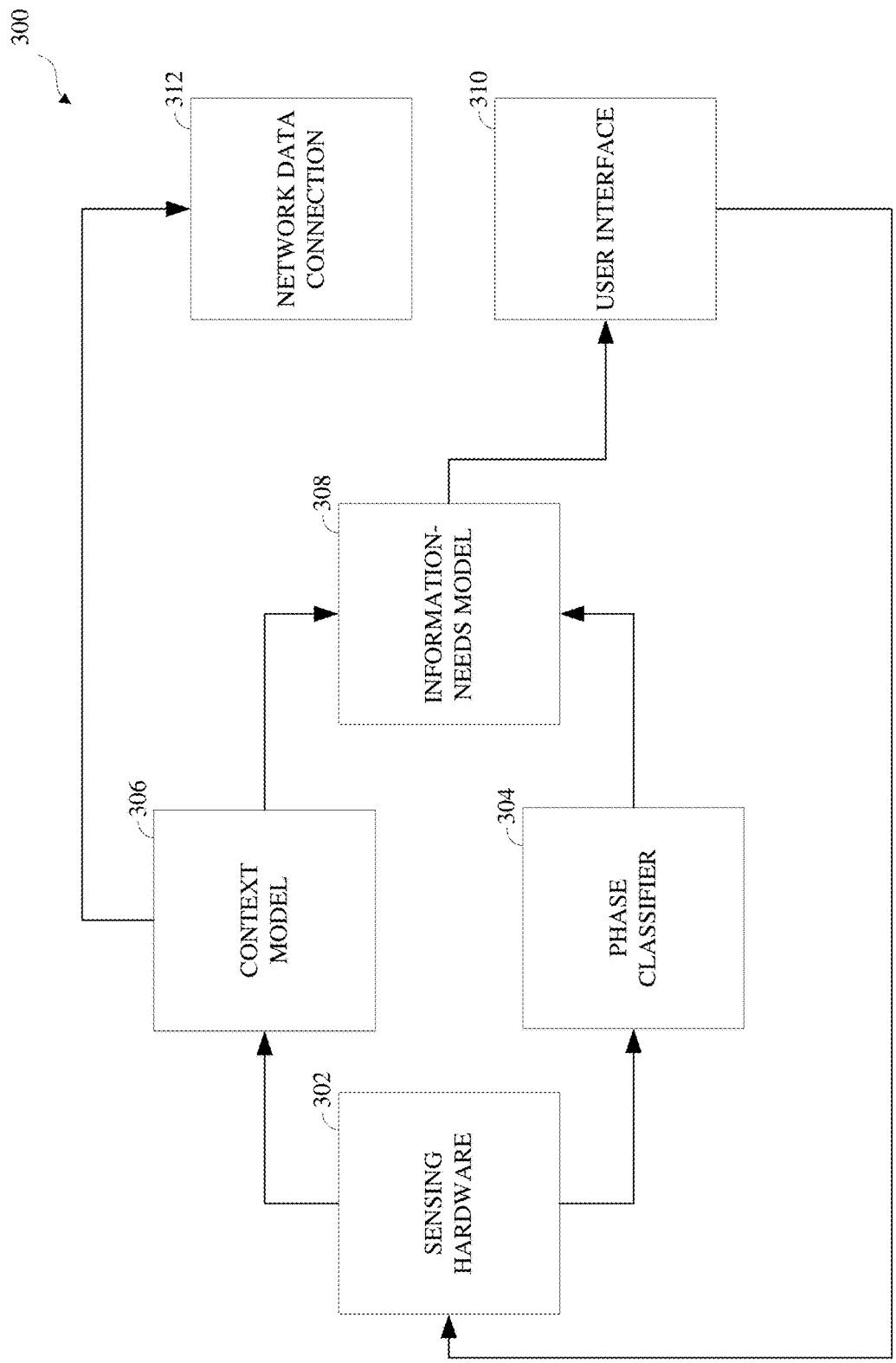
FIG. 3 is a diagram of components of a system for controlling a vehicle traversing a vehicle transportation network using contextual navigation assistance according to the teachings herein.

FIG. 3 is a diagram of components of a system 300 for controlling a vehicle traversing a vehicle transportation network using contextual navigation assistance according to the teachings herein. The system 300 may be implemented in a vehicle such as the vehicle 100 shown in FIG. 1, one of the vehicles 210/211 shown in FIG. 2, am autonomous vehicle, a semi-autonomous vehicle, or any other vehicle using navigation assistance. The system 300 may also be implemented in whole or in part remotely from a vehicle, such as in conjunction with a remote support or remote control system, such as one implemented by one or more processors and other hardware and software at the communication device 240. The system 300 may be implemented by hardware, software, or any combination thereof, including a computer, processing device, processor, program code, etc.

The system 300 can include some or all of sensing hardware 302, a phase classifier 304, a context model 306, an information-needs model 308, a user interface 310, and a network data connection 312.

The sensing hardware 302 comprises sensors, such as sensors 136. The sensing hardware 302 can include internal sensors described with regards to FIG. 1, the external sensors described with regards to FIG. 2, or both. That is, the sensor data can include sensor data from at least one sensor monitoring an environment internal to the vehicle. The sensor data for the environment internal to the vehicle can include, but is not limited to, camera data from an internal or internally-facing camera monitoring a driver of the vehicle, sound data from a microphone within the vehicle, steering data indicating motion of a steered wheel of the vehicle, steering wheel data indicating motion of a steering wheel, pedal data indicating motion of one or more pedals of the vehicle, etc. The sensor data can include sensor data from at least one sensor monitoring an environment external of the vehicle. The sensor data for the environment external to the vehicle can include, but is not limited to, location data, such as geospatial location data, camera data from an external or externally-facing camera, radar data, lidar data, etc.

Although not expressly shown in FIG. 3, the sensor data used by the system 300 may include data sensed from hardware external of the vehicle such as infrastructure sensors or network data made available to the vehicle, the system 300, or both, from other vehicles within the vehicle transportation network, such as the vehicle transportation network 220. Such sensor data may be made available through the various communication techniques within an electronic communication network, such as using wireless network connections of the electronic communication network 230 described with regards to FIG. 2. Feedback from the vehicle may also be used as input to the system 300, as discussed in additional detail below.

While the vehicle traverses a route from a starting location to a stopping location (e.g., a waystop/waypoint or an ending location) within the vehicle transportation network, the system 300 receives the sensor data described above, which indicates at least a condition of the vehicle. The sensor data may be received at the same or at different sampling frequencies. Responsive to the sensor data, and broadly stated, for a plurality of time points along the route (i.e., while the vehicle traverses from the starting location to the stopping location), the system 300 can generate an ordered representation of information regarding a maneuver of the vehicle along the route, and produce, by a user interface, the ordered representation of information at a current time point for use in controlling the vehicle during a current phase of multiple phases of the maneuver. The multiple phases of the maneuver are associated with different proximities of the vehicle to the maneuver, and the ordered representation of information is ranked from most likely information that is necessary, during a current phase of the multiple phases, to successfully complete the maneuver to least likely information that is necessary, during the current phase of the multiple phases, to successfully complete the maneuver.

Figure 4:
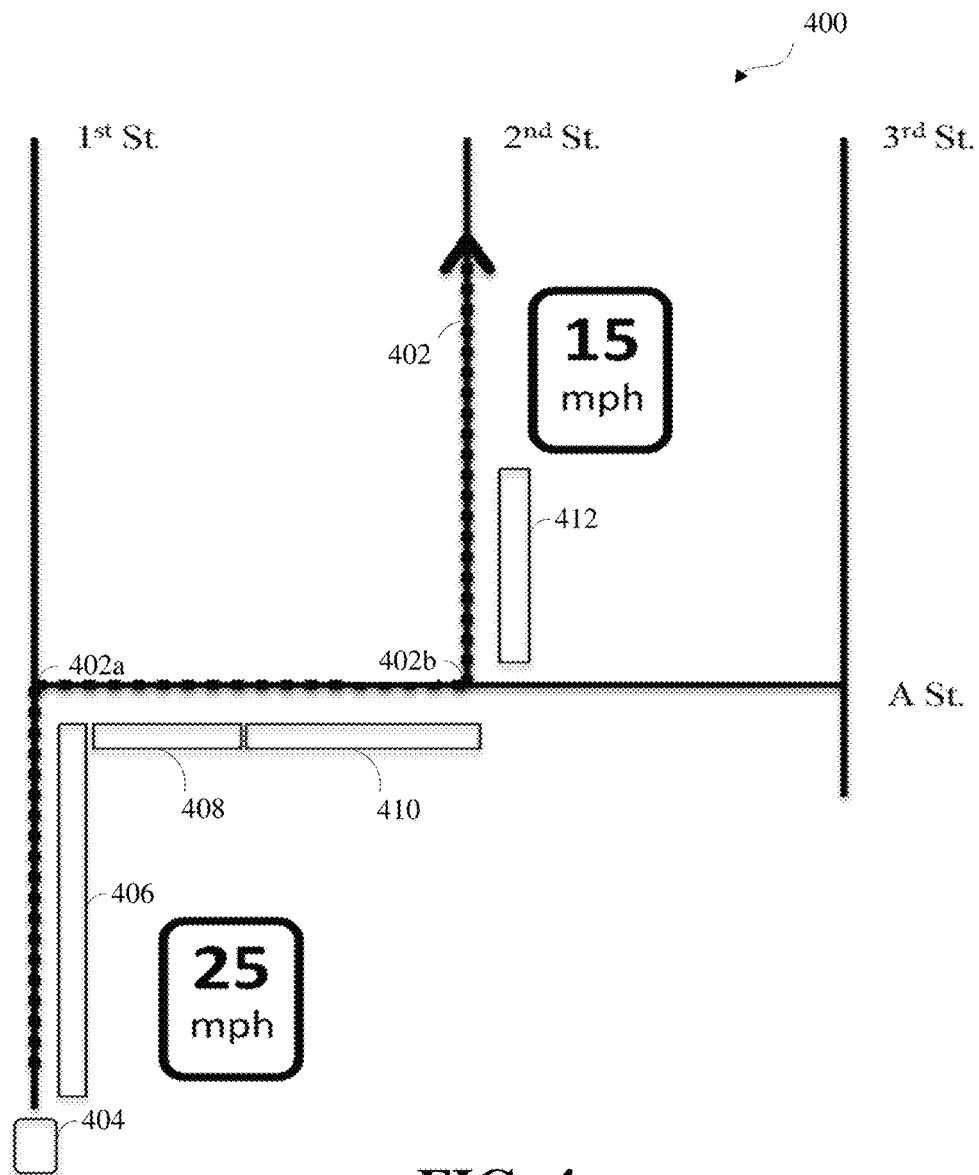
FIG. 4 is a diagram of a portion of a route used to explain a method implemented by the system of FIG. 3.

The components and use of the system 300 are more easily explained with reference to an example. FIG. 4 is a diagram of a portion of a route 402 used to explain a method implemented by the system 300 of FIG. 3. The route 402 is superimposed on map data 400 in FIG. 4, which represents a portion of a vehicle transportation network along which the route 402 travels. The direction of the route 402 is indicated by the arrow. That is, the vehicle 404 travel along $1^{st}$ Street, and turns right onto A Street in a first maneuver 402a, and then turns left in a second maneuver 402b to travel along $2^{nd}$ Street. In this example, the second maneuver 402b is referred to as the current maneuver 402b for which the contextual navigation assistance is generated, and the first maneuver 402a is referred to as the previous maneuver 402a with respect to the current maneuver 402b. While only one previous maneuver 402a is shown in this example, more than one previous maneuver may be considered in the method, or the previous maneuver 402a may not be considered in the method according to some implementations.

As mentioned above, the multiple phases are associated with different proximities of the vehicle to a maneuver along the route. Each maneuver can be associated with two or more phases. Each phase of the multiple phases comprises partially overlapping or non-overlapping portions of the route. The different proximities may be indicated by an amount of time, a distance, or some combination of time and distance. Accordingly, each of the phases may represent a range of proximities of the vehicle to the maneuver along the route. In the example of FIG. 4, the current maneuver 402b is associated with four phases, namely, anticipation phase 406, description phase 408, accompaniment phase 410, and reassurance phase 412.

Referring back to FIG. 3, the information-needs model 308 receives the phase as input, e.g., from the phase classifier 304. In some implementations, one or more of the phases is divided into a plurality of subphases. In such a case, the phase received by the information-needs model 308 can include a subphase. Pseudo-code defining or describing the possible phases and subphases for the example of FIG. 4 is shown below in Table 1.

TABLE 1

| Phase descriptions | |
|---|---|
| Phase/subphase | Definition/description |
| Anticipation Phase 406 | during the previous maneuver 402a, or >5 minutes away from the current maneuver 402b |
| ANT Subphase 1 | >10 minutes from the current maneuver 402b |
| ANT Subphase 2 | >5 minutes from the current maneuver 402b |
| ANT Subphase 3 | during the previous maneuver 402a, the current maneuver 402b is >1 minute and <5 minutes away |
| ANT Subphase 4 | during the previous maneuver 402a, the current maneuver 402b is <1 minute away |
| Description Phase 408 | >1 minute from the current maneuver 402b, or immediately after the previous maneuver 402a even if a time-distance is shorter |
| DESC Subphase 1 | >1 minute from the current maneuver 402b, current maneuver location is in line-of-sight of the vehicle 404 |
| DESC Subphase 2 | >1 minute from the current maneuver 402b, current maneuver location is not in line-of-sight of the vehicle 404 |
| DESC Subphase 3 | >20 seconds from the current maneuver 402b, current maneuver location is in line-of-sight of the vehicle 404 |
| DESC Subphase 4 | >20 seconds from the current maneuver 402b, current maneuver location is not in line-of-sight of the vehicle 404 |
| Accompaniment Phase 410 | <20 seconds from the current maneuver 402b, to maneuver completion |
| ACCOMP Subphase 1 | <20 seconds from the current maneuver 402b, current maneuver location is in line-of-sight of the vehicle 404 |
| ACCOMP Subphase 2 | <20 seconds from present maneuver, maneuver location is not in line-of-sight of the vehicle 404 |
| ACCOMP Subphase 3 | <10 seconds from current maneuver 402b |
| Reassurance Phase 412 | post-maneuver completion of the current maneuver 402b |

It is worth noting that phases are relative to a maneuver, so a vehicle may be in multiple phases at the same time with respect to different maneuvers. For example, and referring to FIG. 4, the right turn at $1^{st}$ and A Streets that comprises the maneuver 402a may have its description and accompaniment phases concurrent with the anticipation phase 406 of the maneuver 402b.

Each phase is associated with at least one candidate variable for inclusion in the ordered representation of information. When a phase is divided into subphases, each of the subphases may be associated with different candidate variables for inclusion in the ordered representation of information. That is, each phase or subphase contains references to variables representing features about the upcoming maneuver, e.g., that an operator needs to know. These features may be prioritized by storage in an ordered list format. Continuing with the example above, the following pseudo-code in Table 2 defines or describes the possible candidate variables that form the content for each of the subphases.

TABLE 2

Phase contents

| Phase/subphase | Phase content/variable |
|---|---|
| Anticipation Phase 406 | |
| ANT Subphase 1 | 1. distance_to_maneuver |
| ANT Subphase 2 | 1. distance_to_maneuver |
| | 2. maneuver_type |
| | 3. maneuver_direction |
| ANT Subphase 3 | 1. lane_position |
| | 2. distance_to_maneuver |
| | 3. maneuver_type |
| | 4. maneuver_direction |
| ANT Subphase 4 | 1. lane_position |
| | 2. maneuver_type |
| | 3. maneuver_direction |
| Description Phase 408 | |
| DESC Subphase 1 | 1. distance_to_maneuver |
| | 2. maneuver_type |
| | 3. maneuver_direction |
| | 4. (infrastructure OR point_of_interest) |
| | 5. toponym_information |
| DESC Subphase 2 | 1. distance_to_maneuver |
| | 2. maneuver_type |
| | 3. maneuver_direction |
| | 4. toponym_information |
| DESC Subphase 3 | 1. maneuver_type |
| | 2. maneuver_direction |
| | 3. (infrastructure OR point_of_interest OR toponym_information) |
| DESC Subphase 4 | 1. distance_to_maneuver |
| | 2. maneuver_type |
| | 3. maneuver_direction |
| | 4. roadway_description |
| | 5. toponym_information |
| Accompaniment Phase 410 | |
| ACCOMP Subphase 1 | 1. maneuver_type |
| | 2. maneuver_direction |
| | 3. (infrastructure OR toponym_information) |
| ACCOMP Subphase 2 | 1. distance_to_maneuver |
| | 2. maneuver_type |
| | 3. maneuver_direction |
| | 4. (infrastructure OR point_of_interest) |
| ACCOMP Subphase 3 | 1. maneuver_type |
| | 2. maneuver_direction |
| | 3. toponym_information |
| Reassurance Phase 412 | 1. distance_to_maneuver |
| | 2. toponomy_information |

In the above, the variable distance_to_maneuver provides information comprising the distance to the current maneuver 402b. The variable maneuver_type provides information comprising the type of the current maneuver 402b, and the variable maneuver_direction provides information comprising the direction of the current maneuver 402b. In this example, maneuver_type is a turn, and maneuver_direction is left. However, a variety of other types and directions are possible. The previous maneuver 402a has a maneuver_type of turn and a maneuver_direction of right, for example. Another maneuver_type may be a lane change, while a maneuver_direction may be left or right to indicate into which lane to enter. Yet another maneuver_type may be a merge of the vehicle from a first lane to a merged lane, where maneuver_direction indicates the direction of the merged lane relative to the first lane. Yet another maneuver_type may be an exit of the vehicle from lane, e.g., of a highway, to an exit ramp, where maneuver_direction indicates the direction of the exit ramp relative to the lane.

The variable roadway_description provides information comprising the road(s) on which the vehicle is traveling, such as a number or cardinality of roads, road segments, or lanes that the vehicle may traverse within a defined spatiotemporal distance. The variable roadway_description may also provide information such as the type of road—highway, two-lane, one-way, etc. The toponym_information may include information comprising place names, street names, or other identifying information related to the route.

The variable infrastructure provides information generally related to physical structures within a defined spatiotemporal area, or operational environment, of the vehicle while it traverses the route. For example, the information may include locations, type, or both of one or more traffic control devices that may affect the operation of the vehicle, or other external objects. In some implementations, the variable infrastructure or the variable roadway_description includes one or more identifiable rules, regulations, or laws that may affect the operation of the vehicle, such as the speed limits shown in FIG. 4. The variable point_of_interest provides information related to a point of interest (POI) within a defined spatiotemporal area, or operational environment, of the vehicle while it traverses the route.

The phase information of an upcoming (or current) maneuver is one form of contextual information for the navigation assistance. Another is a defined context for the vehicle. Again referring to FIG. 3, the information-needs model 308 can receive a context as input, e.g., from the context model 306. Contexts may be stored within the information-needs model 308 as human-authored labels for variables that correspond to different contexts that may be identified by the context model 306 based on real-world data. Like the phases, the context may be one of multiple contexts. Also, like the phases and the subphases, where available, each context is associated with at least one candidate variable for inclusion in an ordered representation of information. That is, like phases and subphases, each context identifies specific information/features that are desirably known, e.g., by an operator, in the context. It is possible that a context also identifies a prompt for an operator related to the route, the maneuver, or some other action related to the context. Contexts may be defined that are available for multiple maneuvers, or may be defined for a particular maneuver. Pseudo-code defining or describing possible contexts for the example of FIG. 4 is shown below in Table 3, along with the possible candidate variables that form the content for each of the contexts.

TABLE 3

Context definitions

| Context | Context content/variable |
|---|---|
| Backed-up Lane | 1. lane_position |
| | 2. distance_to_maneuver |
| Missing/Downed Signage | 1. distance_to_maneuver |
| | 2. maneuver_type |
| | 3. maneuver_direction |
| | 4. (infrastructure OR point_of_interest) |
| Highway Exit Approaching, Vehicle in Wrong Lane | 1. lane_position |
| | 2. maneuver_type |
| | 3. distance_to_maneuver |
| | 4. toponym_information |

TABLE 3-continued

Context definitions

| Context | Context content/variable |
|---|---|
| Highway Exit Approaching, Operator Distracted | 1. maneuver_type<br>2. maneuver_direction<br>3. distance_to_maneuver<br>4. toponym_information |
| Surface Intersection Approaching, Vehicle in Wrong Lane | 1. lane_position<br>2. maneuver_type<br>3. maneuver_direction<br>4. toponym_information |
| Operator Cannot Identify Street-name | 1. (infrastructure OR point_of_interest)<br>2. distance_to_maneuver<br>3. maneuver_direction |
| Operator Cannot Identify Point of Interest | 1. infrastructure<br>2. toponym_information<br>3. distance_to_maneuver<br>4. maneuver_direction |
| Operator Cannot Distinguish Turn | 1. infrastructure<br>2. roadway_description<br>3. (point_of_interest or toponym_information) |
| Intersection Configuration Unusual | 1. roadway_description<br>2. infrastructure |
| Operator Cannot Recall Turn Direction/Distance | 1. distance_to_maneuver<br>2. maneuver_type<br>3. maneuver_direction |
| Operator Uncertain if Still on Right Route | 1. distance_to_maneuver |
| Operator Taking Different Route On Purpose | 1. distance_to_maneuver<br>2. maneuver_type<br>3. prompt_user_about_route |

The variables distance_to_maneuver, maneuver_type, maneuver_direction, roadway_description, toponym_information, infrastructure, and point_of_interest are defined as described above with regards to Table 2. The variable lane_position provides information related to the lane in which the vehicle should be to successfully complete the maneuver, such as the current maneuver 402b. The variable prompt_user_about_route may be used to generate a phrase related to the current planned route from which the operator is deviating (e.g., "Unless you would like to go a different route?").

In the example of FIG. 3, the information-needs model 308 is configured to generate, using the phase and the context as input, the ordered representation of information regarding the maneuver of the vehicle along the route for a plurality of time points. The candidates for the ordered representation of information regarding the maneuver are obtained from the phase/subphase and the context, as described above by example in Tables 2 and 3. That is, the information-needs model 308 provides a structured representation of information needs for different maneuvers, at different proximities to the maneuver; these correspond to the identified phase/subphase. The information-needs model 308 also provides a structured representation of particular needs for difficult contexts. The structure of the information-needs model 308 may comprise ranked lists of variables, corresponding to pieces of information that is necessary to know to successfully complete the maneuver within a current phase/subphase, and given a particular context.

The system 300 uses the information-needs model 308 to decide what information to present for contextual navigation assistance. The information-needs model 308 may be coded in any language, and may solely include predetermined relationship of such data types, determined empirically through research (e.g., not itself an algorithm, but merely outputting the ordered representation of information based on the stored relationships). In some implementations, however, the information-needs model 308 may perform steps to refine the ordered representation of information. For example, the information-needs model 308, or another component of the system 300 receiving output from the information-needs model 308) may combine the variables for the different phase (and optionally subphase) of the maneuver with those for the context of the vehicle in order to rank those variables associated with both higher within the ordered representation of information. Similarly, the information-needs model 308 or another component may limit the number of entries by removing a variable that defines information that is less likely to be needed complete the maneuver when the number of entries in the ordered representation of information exceeds a defined limit.

Figure 5:
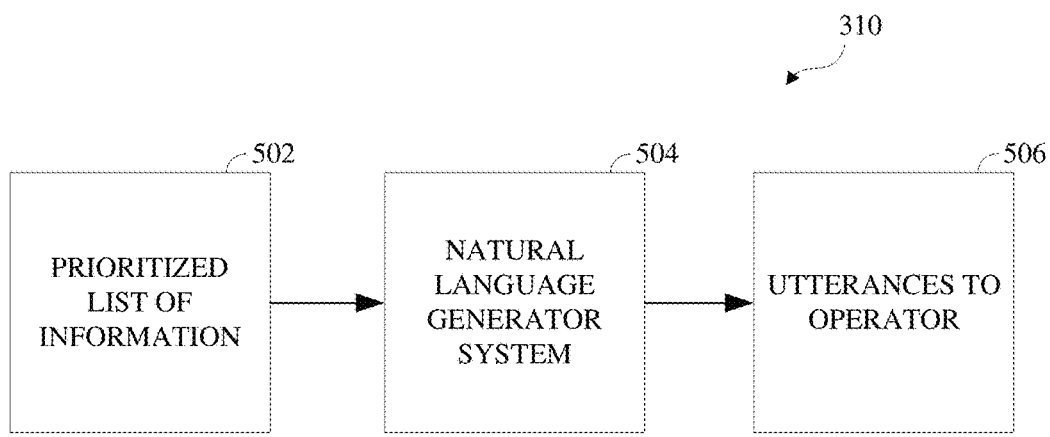
FIG. 5 is a flow chart of an example operation of a user interface according to the teachings herein.

Referring now to FIG. 5, regardless of how the information-needs model 308 generates the ordered representation of information (also referred to as a prioritized list of information 502), this output is provided for processing by a user interface, such as the user interface 310. The user interface 310 is configured to produce the ordered representation of information at a current time point for use during the current phase of the multiple phases of the maneuver. The user interface 310 may be a user interface such as the user interface 135 and can, in some implementations, be a speaker, a video monitor, or some combination thereof. In the example operation of the user interface 310 in FIG. 5, the prioritized list of information 502 is provided to a natural language generator system 504, where any such software that generates human-interpretable instructions out of structured data may be used. The output, here the information needed to successfully complete the current maneuver within the current phase, can then be output as utterances to the operator 506 using hardware (i.e., one or more speakers). Alternatively, or additionally, the prioritized list of information 502 may be reproduced on a monitor or other display accessible to the operator.

In some implementations, a trajectory controller is used to control the vehicle during the current phase/subphase of the maneuver. The trajectory controller can control the vehicle based on feedback from the vehicle related to at least one entry in the ordered representation of information. Examples of a trajectory controller are described with regards to FIG. 1. Most generally, a trajectory controller can be considered any component of the vehicle that responds to actions (e.g., by the operator) in the process of completing the maneuver during the current phase. Referring again to FIG. 3, the feedback may comprise a change in the sensor data, or a response by an operator, or some combination thereof. In some implementations, the feedback (e.g., because of the changed sensor data) may be used in generating the order representation of information for a phase/subphase subsequent to the current phase.

Figure 6:
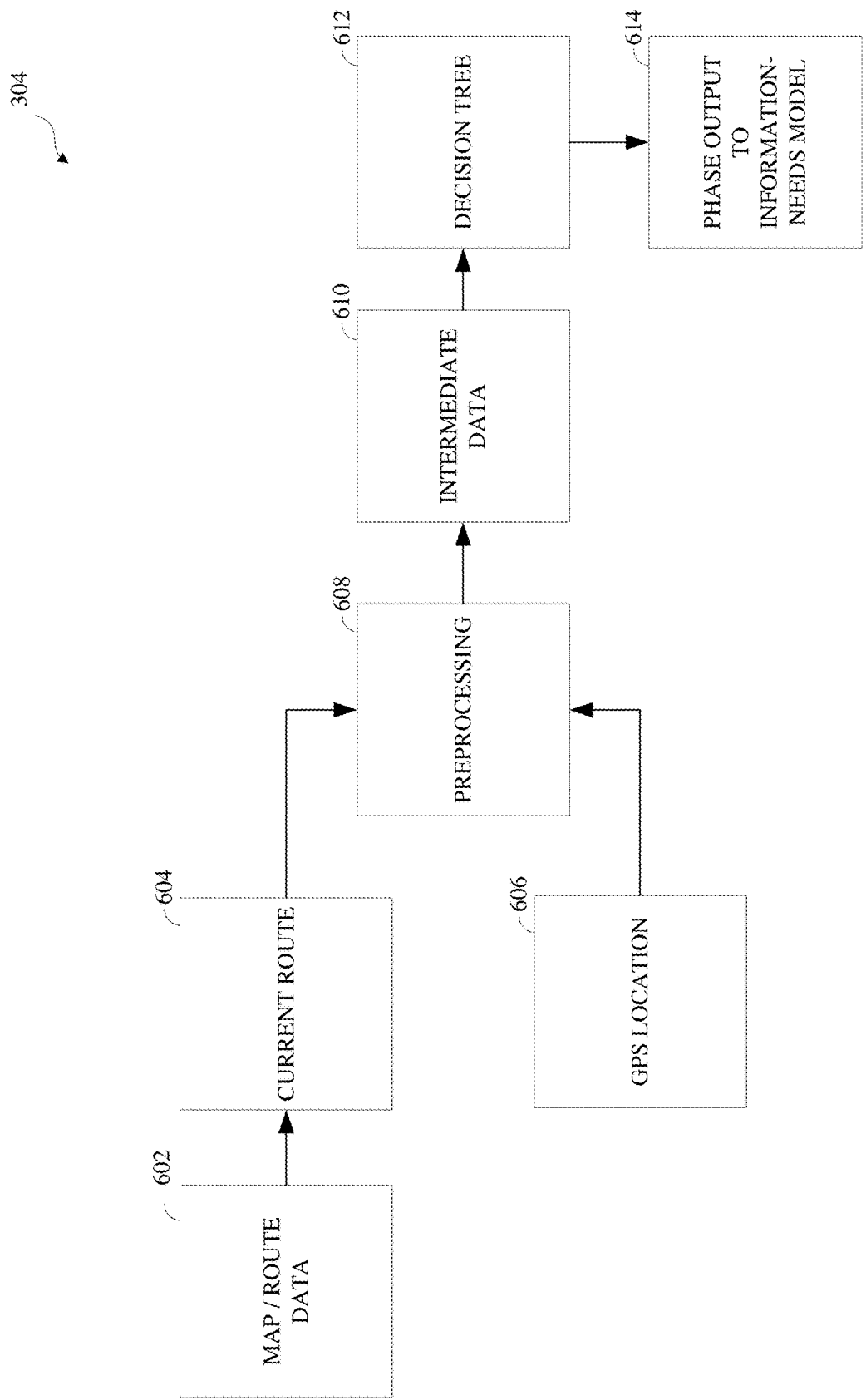
FIG. 6 is an example of a phase classifier according to the teachings herein.
Figure 7:
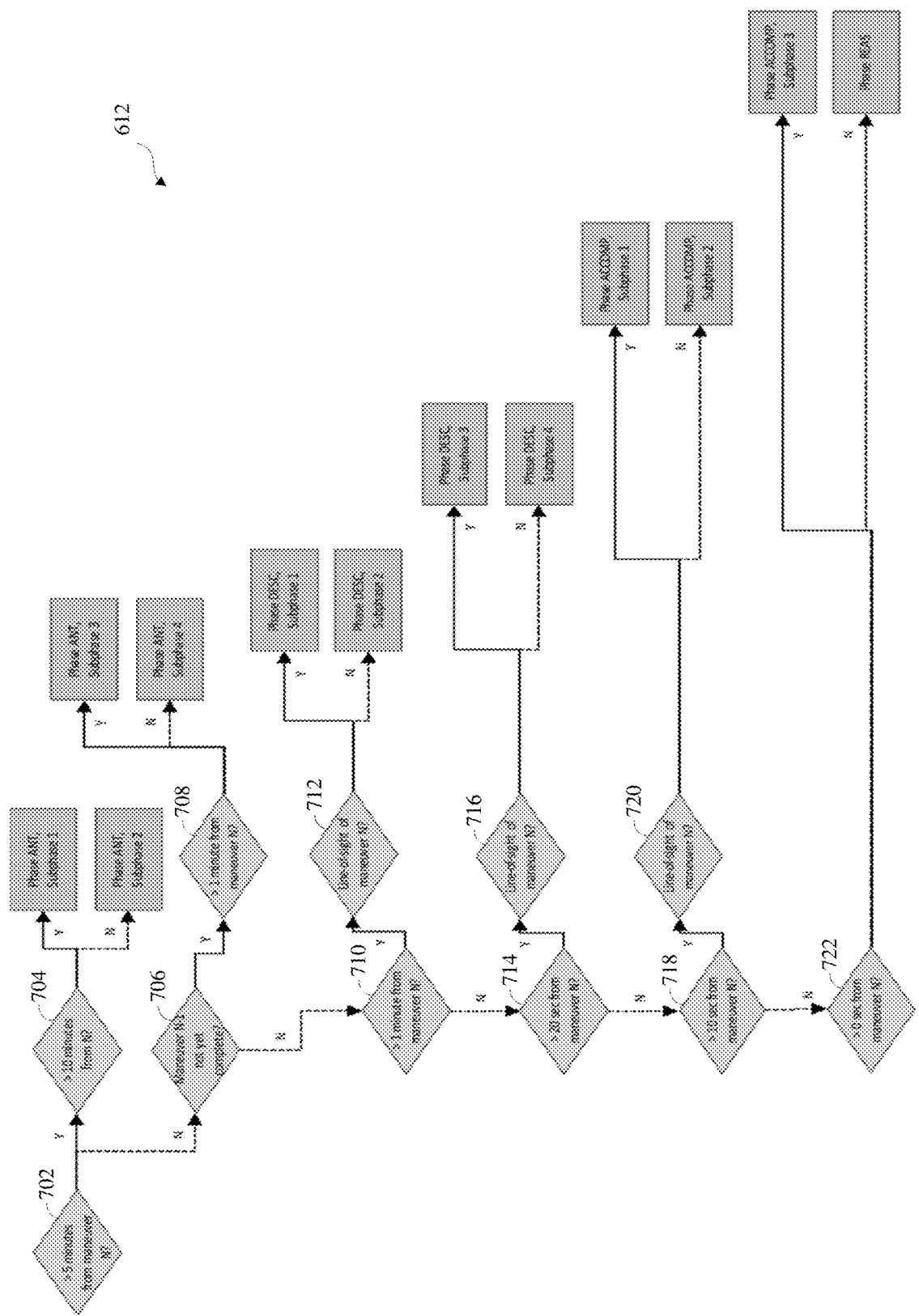
FIG. 7 is a diagram of an example of a decision tree of the phase classifier according to FIG. 6.

Still referring to FIG. 3, next described are possible implementations of the phase classifier 304. FIG. 6 is an example of a phase classifier 304 according to the teachings herein, and FIG. 7 is a diagram of an example of a decision tree 612 of the phase classifier 304 according to FIG. 6.

Generally, the phase classifier 304 takes in the information about the location of the vehicle in the world, the route the vehicle is supposed to take, and the relationship between the vehicle's current position and the positions of at least two adjacent maneuvers in the route. Using this input, the phase classifier 304, which also may be referred to as a phase/subphase classifier 304 where at least one of the phases is divided into subphases, provides an output (i.e., the classification of the vehicle) of a phase and optionally a subphase. The design of the phase classifier 304 can vary as long as it can correctly identify the phase and subphase, as applicable.

The phase classifier 304 is configured to classify, using the sensor data, the vehicle into the phase of multiple phases that are associated with different proximities of the vehicle to a maneuver along the route for the plurality of time points. As mentioned above, each phase is associated with at least one candidate variable for inclusion in the ordered representation of information. In the example of FIG. 6, inputs into the phase classifier 304 can include map/route data 602. The map/route data 602 can include stored data corresponding to the vehicle transportation network, such as the vehicle transportation network 220. An example of map/route data 602 is shown in FIG. 4, where the map/route data 602 includes a portion of a vehicle transportation network including $1^{st}$, $2^{nd}$, and $3^{rd}$ Streets, and A Street. Inputs into the phase classifier 304 can also include the current route 604. FIG. 4 shows an example where a portion of a current route 402 is superimposed on the map/route data 602. Sensor data input into the phase classifier 304 can include a detected position of the vehicle, such as a GPS location 606.

As shown in FIG. 6, these inputs are provided to a preprocessing component 608. The preprocessing component 608 uses the route and a Global Positioning System location of the vehicle to determine intermediate data 610 comprising at least a time-distance of the vehicle from the maneuver, such as the current maneuver 402b. The preprocessing component 608 may use geometric calculations of the vehicle with respect to the upcoming maneuver to characterize the vehicle's relationship to that maneuver. For example, the time-distance of the vehicle from the (e.g., current) maneuver may be an amount of time expected for the vehicle to reach the location of the current maneuver based on the current route 604 and the speed limit as indicated by the map/route data 602. The location of the current maneuver 402b is labeled 402b in the example of FIG. 4 (which location may be considered to correspond to the end of the accompaniment phase 410). In some implementations, the speed and pose of the vehicle may be used as input to the preprocessing component 608 for this determination.

Other calculations may be used in the analysis based on the definitions of the phases and subphases. For example, where the phases are as shown in Table 1, a time-distance of the vehicle from a (e.g., previous) maneuver before the current maneuver may be determined in a like manner as described above. Alternatively, or additionally, a determination may be made as to the position of the vehicle relative to the previous maneuver, such as the previous maneuver 402a. For example, the preprocessing component 608 may determine the position by determining whether or not the vehicle has completed the previous maneuver. Again, the preprocessing component 608 may use geometric calculations to determine this information.

In another example using FIG. 1, the preprocessing component 608 may determine whether or not the current maneuver is within a line-of-sight of the vehicle as part of the intermediate data 610. This determination may be made using geometric calculations, but it could also be made using input from sensing hardware 302 (e.g., external-facing cameras).

Whatever data comprises the intermediate data 610, the intermediate data 610 may be used to output the current phase (and optionally subphase). In the example of FIG. 6, a decision tree 612 receives the intermediate data 610 and outputs the current phase 614, e.g., to the information-needs model 308. The decision tree 612 of FIG. 7 uses the phase and subphase definitions of Table 1 as an example of how the phase classifier 304 outputs a phase, and FIG. 7 is only one example of a decision tree that could be used for this data.

FIG. 7 is explained in additional detail using the example of FIG. 4. In FIG. 7, a first decision 702 identifies whether the vehicle 404 is greater than 5 minutes away from the current maneuver 402b (maneuver N in FIG. 7). This may be determined by the time-distance of the vehicle 404 from the current maneuver 402b. Where the vehicle 404 is greater than 5 minutes away from the current maneuver 402b, the decision tree 612 advances to the second decision 704, which identifies whether the vehicle is greater than 10 minutes away from the current maneuver 402b. If yes, the current phase is subphase 1 of the anticipation phase 406. If no, the current phase is subphase 2 of the anticipation phase 406.

In contrast, if the output of the first decision 702 is that the vehicle 404 is not greater than 5 minutes away from the current maneuver 406b, the third decision 706 of the decision tree 612 identifies whether the previous maneuver 402a (maneuver N−1 in FIG. 7) is complete. This may be determined from the intermediate data 610 indicating the position of the vehicle 404 relative to the previous maneuver 402a. If the previous maneuver 402a is not yet complete, the decision tree 612 advances to the fourth decision 708, which identifies whether the vehicle 404 is greater than 1 minute away from the current maneuver 402b. If yes, the current phase is subphase 3 of the anticipation phase 406. If no, the current phase is subphase 4 of the anticipation phase 406.

If instead the third decision 706 identifies that the previous maneuver 402a is complete, the fifth decision 710 of the decision tree 612 identifies whether the vehicle 404 is greater than 1 minute away from the current maneuver 402b identifies whether the vehicle 404 is greater than 1 minute away from the current maneuver 402b. Where the vehicle 404 is greater than 1 minute away from the current maneuver 402b, the decision tree 612 advances to the sixth decision 712, which identifies whether the vehicle 404 has a line-of-sight to the current maneuver 402b. If yes, the current phase is subphase 1 of the description phase 408. If no, the current phase is subphase 2 of the description phase 408.

In contrast, if the fifth decision 710 identifies that the vehicle 404 is not greater than 1 minute away from the current maneuver 402b, the seventh decision 714 of the decision tree 612 identifies whether the vehicle 404 is greater than 20 seconds away from the current maneuver 402b. Where the vehicle 404 is greater than 20 seconds away from the current maneuver 402b, the decision tree 612 advances to the eighth decision 716, which identifies whether the vehicle 404 has a line-of-sight to the current maneuver 402b. If yes, the current phase is subphase 3 of the description phase 408. If no, the current phase is subphase 4 of the description phase 408.

If the vehicle 404 is not greater than 20 seconds away from the current maneuver 402b as identified by the seventh decision 714, the decision tree 612 advances to the ninth decision 718. The ninth decision 718 identifies whether the vehicle 404 is greater than 10 seconds away from the current maneuver 402b. Where the vehicle 404 is greater than 10 seconds away from the current maneuver 402b, the decision tree 612 advances to the tenth decision 720, which identifies whether the vehicle 404 has a line-of-sight to the current maneuver 402b. If yes, the current phase is subphase 1 of the accompaniment phase 410. If no, the current phase is subphase 2 of the accompaniment phase 410.

If instead the ninth decision 718 identifies that the vehicle 404 is not greater than 10 seconds away from the current maneuver 402b. Where the vehicle 404 is greater than 10 seconds away from the current maneuver 402b, the decision tree 612 advances to the eleventh decision 722, which identifies whether the vehicle 404 is greater than 0 seconds from the current maneuver 402b. If yes, the current phase is subphase 3 of the accompaniment phase 410. If no, the current phase is the reassurance phase 412.

Figure 8:
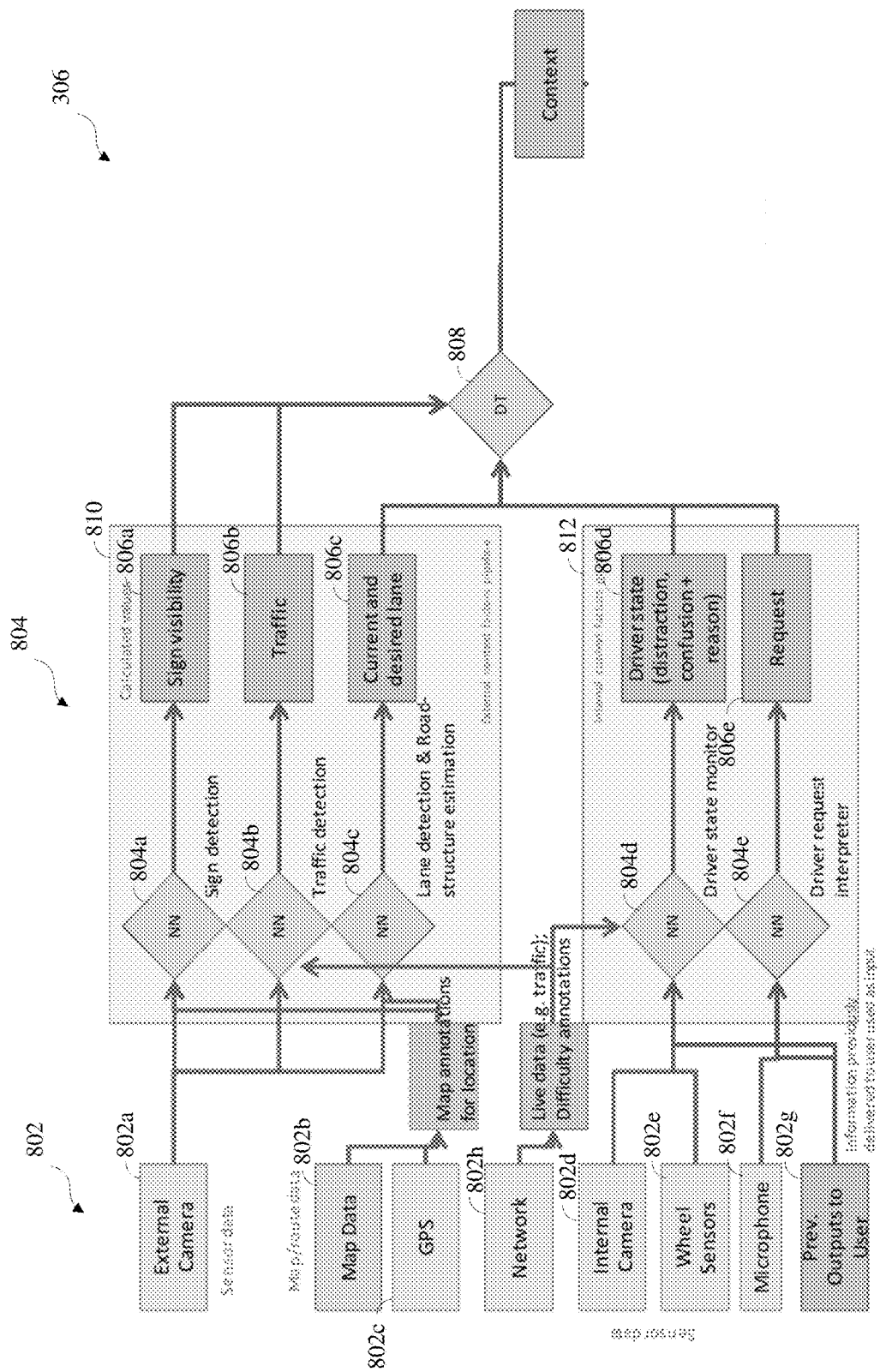
FIG. 8 is a diagram of an example of a context model according to the teachings herein.
Figure 9:
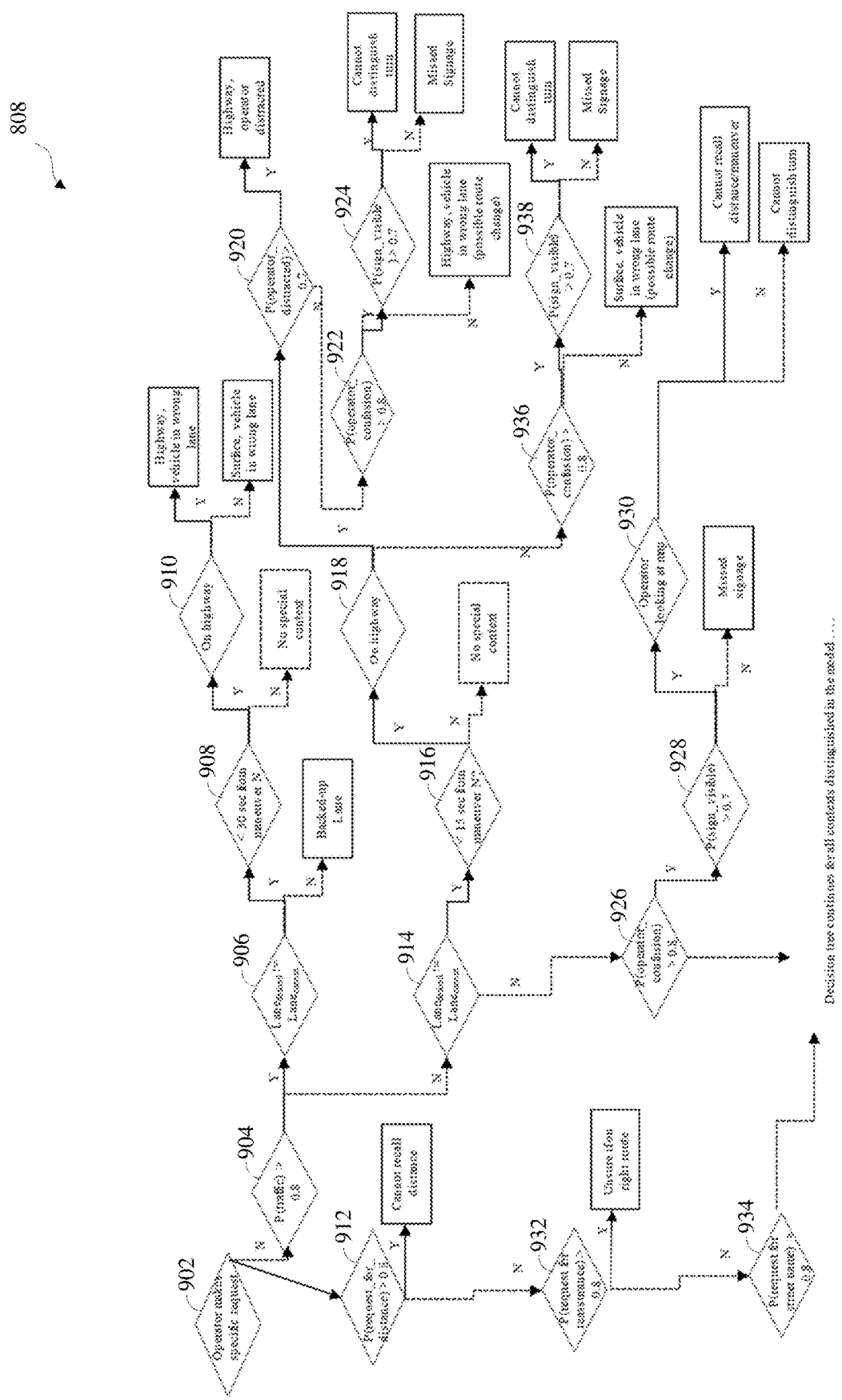
FIG. 9 is a diagram of an example of a decision tree of the context model according to FIG. 8.

Referring back to FIG. 3, next described are possible implementations of the context model 306. FIG. 8 is a diagram of an example of a context model 306 according to the teachings herein, and FIG. 9 is a diagram of an example of a decision tree of the context model 306 according to FIG. 8.

The context model 306 is configured to define a context for the vehicle using sensor data for a plurality of time points while the vehicle traverses from the starting location to the stopping location of a route. The context is one of multiple contexts, and each context is associated with at least one candidate variable for inclusion in the ordered representation of information described previously.

The context model 306 is generally used to identify what situation the vehicle is in, in order to provided tailored instructions for the particular situation. The context may be dictated, at least in some cases, by the driver as the operator of the vehicle. The context model 306 includes algorithms that take sensor data and map information to determine what the current context is. This context is provided to the information-needs model 308, which selects the appropriate pieces of information to convey to the operator as described previously. The context model 306 may be generated using a variety of classification techniques. In an example, the context model 306 includes at least one classifier 804 that receives sensor data 802 as input and identifies individual features 806a-806e using the sensor data, where each feature is related to internal condition, an external condition, or both, of the vehicle. The context model 306 can also include a decision tree 808 that receives the individual features as input and outputs the context.

More specifically, the example of FIG. 8 shows a combination of neural networks (NN) as classifiers 804 for individual feature detection and at least one decision tree 808 for context classification based on the detected features 806a-806e. The classifiers 804 are arranged for detecting contextual features into two pipelines, an external context factor pipeline 810 and an external context factor pipeline 812.

The external context factor pipeline 810 can include one or more neural networks 804a, 804b, 804c as classifiers 804 that use sensor data as input and output external context features 806a-806c. The input to the neural networks 804a, 804b, 804c can include external camera data 802a, map data 802b, and location data 802c. The neural network 804a may perform sign detection and output sign visibility as an external context feature 806a. The neural network 804b may perform traffic detection and output traffic information as an external context feature 806b. The neural network 804c may perform lane detection road-structure estimation and a current lane, a desired lane, or both as an external context feature 806c. The map data 802b and location data 802c may be combined to identify map annotations for a location, such as annotating a map with locations of a previous maneuver, a current maneuver, a point of interest, etc.

The internal context factor pipeline 812 can include one or more neural networks 804d, 804e as classifiers 804 that use sensor data as input and output internal context features 806d and 806e. The input to the neural networks 804d, 804e can include internal camera data 802d, wheel and/or steering data 802e, input data from an operator of the vehicle, such as microphone data 802f, and previous outputs to the operator 802g as inputs. The neural network 804d may determine the operator state and output the operator state as an internal context feature 806d. The neural network 804e may determine (or interpret) an operator request and output the request as an internal context feature 806e.

In some implementations, the input to one or more of the classifiers 804 (e.g., the neural networks 804a-804e) can include network data 802h. The network data 802h can include data received from other vehicles within the vehicle transportation network. For example, the network data 802h can include live traffic data, operator status data of a driver within the vehicle transportation network, or both. The network data 802h can be provided as input to the neural network 804b for traffic detection, the neural network 804d for determining the operator state.

Each individual classifier for contextual features may be engineered according to a variety of methods. For example, a neural network classifier for an "operator state" or "driver state", such as the neural network 804d, may be trained using labeled data (in-cabin video, operator utterances, coupled with human-authored attention and confusion levels) with known machine learning models. As another example sign detection according to the neural network 804a may be trained using YOLO (You Only Look Once) CNN classifiers that are optimized for real-time applications.

Regardless of how the classifiers 804 are arranged and trained, the decision tree 808 can receive external context feature(s) and internal context feature(s) as input and output the context. FIG. 9 is a partial decision tree. That is, the decision tree 808 shows only some of the contexts of Table 3. Additional decision block would be needed for other contexts. The decision tree 808 is explained using reference numbers of FIG. 4 to aid explanation.

As can be seen in FIG. 9, if a first decision 902 indicates that the operator has not made a specific request, a second decision 904 indicates that the probability of traffic between the vehicle 404 and the current maneuver 402b is greater than 80%, and a third decision 906 indicates that the current lane of the vehicle 404 is the desired lane for the current maneuver 402b, the context of "backed-up lane" is output. If instead the third decision 906 indicates that the current lane of the vehicle 404 is not the desired lane for the current maneuver 402b, and a fourth decision 908 indicates that the vehicle 404 is greater than or equal to 30 seconds from the current maneuver 402b, no special context is output. If instead the fourth decision 908 indicates that the vehicle 404 is less than 30 seconds from the current maneuver 402b, and a fifth decision 910 indicates that the vehicle 404 is on a highway, the context of "highway exit approaching, vehicle in wrong lane" is output. If instead the fifth decision 910 indicates that the vehicle 404 is not on a highway, the context of "surface exit approaching, vehicle in wrong lane" is output.

If the first decision 902 indicates that the operator has made a specific request, and a sixth decision 912 indicates a probability that the request is the distance to the current maneuver 402a is greater than 80%, a context of "operator cannot recall turn direction/distance" is output.

If the first decision 902 indicates that the operator has not made a specific request, the second decision 904 indicates that the probability of traffic between the vehicle 404 and the current maneuver 402b is less than or equal to 80%, a seventh decision 914 indicates that the current lane of the vehicle 404 is not the desired lane for the current maneuver 402b, and an eighth decision 916 indicates that the vehicle 404 is not less than 15 seconds from the current maneuver 402b, no special context is output. If instead the eighth decision 916 indicates that the vehicle 404 is less than 15 seconds from the current maneuver 406b, a ninth decision 918 indicates whether or not the vehicle 404 is on a highway.

If the ninth decision 918 indicates that the vehicle 404 is on the highway, a tenth decision 920 queries as to whether the operator is likely distracted. If the tenth decision 920 indicates a probability that the operator is distracted is greater than 70%, the context "highway exit approaching, operator distracted" is output. If instead the tenth decision 920 indicates a probability that the operator is distracted is less than or equal to 70%, and an eleventh decision 922 indicates a probability that the operator is confused is less than or equal to 80%, a context "operator taking different route on purpose" may be output. Another possible output is "highway exit approaching, vehicle in wrong lane" with a query as to whether the operator is making a route change. If instead the eleventh decision 922 indicates a probability that the operator is confused is greater than 80%, and a twelfth decision 924 indicates a probability that a sign is visible is greater than 70%, the context "operator cannot distinguish turn" is output. Otherwise, where the twelfth decision 924 indicates a probability that a sign is visible is less than or equal to 70%, the context "missing/downed signage" is output.

If the first decision 902 indicates that the operator has not made a specific request, the second decision 904 indicates that the probability of traffic between the vehicle 404 and the current maneuver 402b is less than or equal to 80%, and the seventh decision 914 indicates that the current lane of the vehicle 404 is the desired lane for the current maneuver 402b, a thirteenth decision 926 indicates a probability that the operator is confused is less than or equal to 80%, the decision tree 808 proceeds to additional decisions (not shown) to determine the context. If instead the thirteenth decision 926 indicates a probability that the operator is confused is greater than 80%, a fourteenth decision 928 indicates a probability that a sign is visible to the operator is greater than 70%, and a fifteenth decision 930 indicates that the operator is looking at a map, a context "operator cannot recall turn direction/distance" is output. Otherwise, where the fifteenth decision 930 indicates that the operator is not looking at a map, the context "operator cannot distinguish turn" is output.

If the first decision 902 indicates that the operator has not made a specific request, the second decision 904 indicates that the probability of traffic between the vehicle 404 and the current maneuver 402b is less than or equal to 80%, the seventh decision 914 indicates that the current lane of the vehicle 404 is the desired lane for the current maneuver 402b, a thirteenth decision 926 indicates a probability that the operator is confused is greater than 80%, and the fourteenth decision 928 indicates a probability that a sign is visible to the operator is less than or equal to 70%, a context "missing/downed signage" is output.

If the first decision 902 indicates that the operator has made a specific request, the sixth decision 912 indicates a probability that the request is the distance to the current maneuver 402a is less than or equal to 80%, and a sixteenth decision 932 indicates a probability that the specific request is for reassurance is greater than 80%, a context of "operator uncertain if still on right route" is output.

If the first decision 902 indicates that the operator has made a specific request, the sixth decision 912 indicates a probability that the request is the distance to the current maneuver 402a is less than or equal to 80%, and the sixteenth decision 932 indicates a probability that the specific request is for reassurance is less than or equal to 80%, a seventeenth decision 934 indicates whether or not a probability the specific request is for a street name is greater than 80%. The decision tree 808 proceeds to determine the context based on the indication of the seventeenth decision 934 (not shown).

If the first decision 902 indicates that the operator has not made a specific request, the second decision 904 indicates that the probability of traffic between the vehicle 404 and the current maneuver 402b is less than or equal to 80%, a seventh decision 914 indicates that the current lane of the vehicle 404 is not the desired lane for the current maneuver 402b, the eighth decision 916 indicates that the vehicle 404 is less than 15 seconds from the current maneuver 402b, and the ninth decision 918 indicates that the vehicle 404 is not on the highway, an eighteenth decision 936 queries as to whether the operator is likely confused. If the eighteenth decision 936 indicates a probability that the operator is confused is less than or equal to greater than 80%, a context "operator taking different route on purpose" may be output. Another possible output is "surface exit approaching, vehicle in wrong lane" with a query as to whether the operator is making a route change. If instead the eighteenth decision 936 indicates a probability that the operator is confused is greater than 80%, and a nineteenth decision 938 indicates a probability that a sign is visible is greater than 70%, the context "operator cannot distinguish turn" is output. Otherwise, where the nineteenth decision 938 indicates a probability that a sign is visible is less than or equal to 70%, the context "missing/downed signage" is output.

Referring back to FIG. 3, the context model 306 outputs the context to the information-needs model 308 as previously described. Further, the context model 306 may transmit, based on the context, network data for use by other vehicles within the vehicle transportation network using a network data connection 312. The network data can include live traffic data, operator status data of a driver within the vehicle, or some combination thereof.

The teachings herein allow for more effective navigation instructions without information overload, particularly for an operator. For this reason, the teachings herein may also provide a more preferable experience. Namely, systems that provide higher quality instructions—containing the most relevant information, at the appropriate time—provide a preferred navigation experience to systems that provide too much, too little, or irrelevant information, or which do not provide sufficient support throughout a maneuver. Error rates in completing maneuvers may also be lower for the systems described herein that have higher quality instructions.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A system for controlling a vehicle traversing a vehicle transportation network using contextual navigation assistance, the system comprising:
   a processor configured to receive, while the vehicle traverses a route from a starting location to a stopping location within the vehicle transportation network, sensor data indicating at least a condition of the vehicle;
   a context model configured to define a context for the vehicle using the sensor data for a plurality of time points while the vehicle traverses from the starting location to the stopping location, wherein the context is one of multiple contexts, and each context is associated with at least one candidate variable for inclusion in an ordered representation of information;
   a phase classifier configured to classify, using the sensor data, the vehicle into a phase of multiple phases associated with different proximities of the vehicle to a maneuver along the route for the plurality of time points, wherein each phase is associated with at least one candidate variable for inclusion in the ordered representation of information;
   an information-needs model configured to generate, using the phase and the context as input, the ordered representation of information regarding the maneuver of the vehicle along the route for the plurality of time points, wherein the ordered representation of information is ranked from most likely information that is necessary, during a current phase of the multiple phases, to successfully complete the maneuver to least likely information that is necessary, during the current phase of the multiple phases, to successfully complete the maneuver;
   a user interface configured to produce the ordered representation of information at a current time point for use during the current phase of the multiple phases of the maneuver; and
   a trajectory controller configured to control at least one component of the vehicle during the current phase of the multiple phases based on feedback from the vehicle related to at least one entry in the ordered representation of information.

2. The system of claim 1, wherein:
   the sensor data comprises sensor data from at least one sensor monitoring an environment external to the vehicle and from at least one sensor monitoring an environment internal to the vehicle;
   the sensor data for the environment external to the vehicle includes at least two of Global Positioning System data, camera data from an externally-facing camera, radar data, lidar data, or network data made available to the vehicle from other vehicles within the vehicle transportation network; and
   the sensor data for the environment internal to the vehicle includes at least two of camera data from an internally-facing camera monitoring a driver of the vehicle, sound data from a microphone within the vehicle, steering data indicating motion of a steered wheel of the vehicle, or pedal data indicating motion of one or more pedals of the vehicle.

3. The system of claim 2, wherein:
   an operator of the vehicle is the driver of the vehicle;
   the user interface comprises at least one of a speaker or a video monitor within the vehicle; and
   the feedback comprises a change in the sensor data.

4. The system of claim 1, wherein the phase classifier is configured to classify the vehicle into the phase of multiple phases by:
   determining a time-distance from the maneuver, wherein the maneuver is a current maneuver;
   determining a position of the vehicle relative to a previous maneuver before the current maneuver;
   determining whether or not the current maneuver is within a line-of-sight of the vehicle; and
   classifying the vehicle into the phase using the time-distance from the current maneuver, the position of the vehicle relative to the previous maneuver, and whether or not the current maneuver is within a line-of-sight of the vehicle as inputs into a decision tree whose output is the phase.

5. The system of claim 1, wherein:
   at least one of the multiple phases is divided into a plurality of subphases, and
   the phase classifier is configured to classify the vehicle into the phase of multiple phases by:

classifying the vehicle into the phase of the multiple phases; and
upon a condition that the phase is divided into a plurality of subphases, classifying the vehicle into a subphase of the phase.

6. The system of claim 1, wherein the context model comprises:
a first neural network using map data, external camera data, and location data as inputs, and outputting external context features;
a second neural network using at least two of internal camera data, wheel data, steering data, input data from an operator of the vehicle, or previous outputs to the operator as inputs, and outputting internal context features; and
a decision tree that receives the external context features and the internal context feature as input and outputs the context.

7. The system of method of claim 6, wherein:
the second neural network uses at least two of the internal camera data, the wheel data, the steering data, the input data from an operator of the vehicle, the previous outputs to the operator, or network data as inputs, the network data including at least one of live traffic data or operator status data of a driver within the vehicle transportation network.

8. A system for controlling a vehicle traversing a vehicle transportation network using contextual navigation assistance, the system comprising:
a processor configured to:
receive, while the vehicle traverses a route from a starting location to a stopping location within the vehicle transportation network, sensor data indicating at least a condition of the vehicle;
for a plurality of time points while the vehicle traverses from the starting location to the stopping location:
generate, responsive to the sensor data, an ordered representation of information regarding a maneuver of the vehicle along the route, wherein the maneuver comprises multiple phases associated with different proximities of the vehicle to the maneuver, and the ordered representation of information is ranked from most likely information that is necessary, during a current phase of the multiple phases, to successfully complete the maneuver to least likely information that is necessary, during the current phase of the multiple phases, to successfully complete the maneuver; and
produce, by a user interface, the ordered representation of information at a current time point for use in controlling the vehicle during the current phase of the multiple phases of the maneuver.

9. The system of claim 8, further comprising:
a trajectory controller configured to control at least one component of the vehicle during a current phase of the multiple phases based on feedback from the vehicle related to at least one entry in the ordered representation of information.

10. The system of claim 8, wherein the processor is configured to, for a plurality of time points while the vehicle traverses from the starting location to the stopping location:
determine the current phase of the multiple phases using a phase classifier, the phase classifier comprising:
a preprocessing component that uses the route and a Global Positioning System location of the vehicle to determine intermediate data comprising at least a time-distance of the vehicle from the maneuver; and
a decision tree receiving the intermediate data and outputting the current phase.

11. The system of claim 10, wherein the maneuver is a current maneuver, and the intermediate data comprises:
a position of the vehicle relative to a maneuver before the current maneuver.

12. The system of claim 8, wherein the processor is configured to:
transmit, based on the context, network data for use by other vehicles within the vehicle transportation network, the network data including at least one of live traffic data or operator status data of a driver within the vehicle.

13. A method for controlling a vehicle traversing a vehicle transportation network using contextual navigation assistance, the method comprising:
receiving, while the vehicle traverses a route from a starting location to a stopping location within the vehicle transportation network, sensor data indicating at least a condition of the vehicle;
generating, responsive to the sensor data, a first ordered representation of information regarding a maneuver of the vehicle along the route, wherein the maneuver comprises multiple phases associated with different proximities of the vehicle to the maneuver, and the first ordered representation of information is ranked from most likely information necessary, during a first phase of the multiple phases, to successfully complete the maneuver to least likely information that is necessary, during the first phase of the multiple phases, to successfully complete the maneuver;
producing, by a user interface, the first ordered representation of information at a first point in time for use while during the first phase of the multiple phases of the maneuver;
controlling, using a trajectory controller, the vehicle during the first phase based on feedback from the vehicle related to at least one entry in the first ordered representation of information;
generating, responsive to the sensor data, a second ordered representation of information regarding the maneuver of the vehicle along the route, wherein the second ordered representation of information is ranked from most likely information that is necessary to know, during a second phase of the multiple phases, to successfully complete the maneuver to least likely information that is necessary to know, during the second phase of the multiple phases, to successfully complete the maneuver, and the second phase of the multiple phases is subsequent to the first phase;
producing, by the user interface, the second ordered representation of information at a second point in time for use during the second phase of the multiple phases, wherein the second point in time is subsequent to the first point in time; and
controlling, using a trajectory controller, the vehicle during the second phase based on feedback from the vehicle related to at least one entry in the second ordered representation of information.

14. The method of claim 13, wherein generating the second ordered representation is responsive to the sensor data and the feedback from the vehicle during the first phase of the multiple phases.

15. The method of claim 13, further comprising:
classifying, by a phase classifier, the vehicle into a phase of the multiple phases using the sensor data; and providing the phase to an information-needs model, the information-needs model generating multiple ordered representations including the first ordered representation and the second ordered representation.

16. The method of claim 15, wherein classifying the vehicle into the phase of the multiple phases comprises:
   determining a time-distance from the maneuver, wherein the maneuver is a current maneuver;
   determining a position of the vehicle relative to a previous maneuver before the current maneuver; and
   classifying the vehicle into the phase using the time-distance from the current maneuver and the position of the vehicle relative to the previous maneuver.

17. The method of claim 13, further comprising:
   classifying, by a phase classifier, the vehicle into each of the first phase and the second phase using a current position of the vehicle, the route of the vehicle, and a relationship between the current position and at least two adjacent maneuvers in the route;
   providing the first phase as input for generating the first ordered representation of information; and
   providing the second phase as input for generating the second ordered representation of information.

18. The method of claim 13, wherein:
   the first phase is divided into a plurality of first subphases,
   the first ordered representation of information is ranked from the most likely information that is necessary, during the first phase and a first subphase of the plurality of first subphases, to successfully complete the maneuver to the least likely information that is necessary, during the first phase and the first subphase, to successfully complete the maneuver;
   the second phase is divided into a plurality of second subphases, and
   the second ordered representation of information is ranked from the most likely information that is necessary, during the second phase and a second subphase of the plurality of second subphases, to successfully complete the maneuver to the least likely information that is necessary, during the second phase and the second subphase, to successfully complete the maneuver.

19. The method of claim 13, further comprising:
   defining, by a context model, a context for the vehicle using the sensor data, wherein:
      the context is one of multiple contexts including a first context and a second context,
      each context is associated with at least one candidate variable for inclusion in an ordered representation of information,
      the first context is associated with at least one candidate variable for inclusion in the first ordered representation of information, and
      the second context is associated with at least one candidate variable for inclusion in the second ordered representation of information; and
   providing the context to an information-needs model, the information-needs model generating multiple ordered representations including the first ordered representation and the second ordered representation.

20. The method of claim 19, wherein the context model comprises:
   at least one classifier that receives the sensor data as input and identifies individual features using the sensor data, each feature related to at least one of an internal condition or an external condition of the vehicle; and
   a decision tree that receives the individual features as input and outputs the context.

* * * * *